United States Patent
Schwarz

(10) Patent No.: US 10,202,185 B2
(45) Date of Patent: Feb. 12, 2019

(54) GEARED TURBOFAN WITH IMPROVED SPINNER

(71) Applicant: United Technologies Corporation, Hartford, CT (US)

(72) Inventor: Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 650 days.

(21) Appl. No.: 14/709,744

(22) Filed: May 12, 2015

(65) Prior Publication Data

US 2016/0001873 A1 Jan. 7, 2016

Related U.S. Application Data

(60) Provisional application No. 62/010,105, filed on Jun. 10, 2014.

(51) Int. Cl.
*B64C 11/14* (2006.01)
*F02K 3/06* (2006.01)
*F02C 3/107* (2006.01)
*F02C 7/04* (2006.01)
*F02C 7/36* (2006.01)

(52) U.S. Cl.
CPC .............. *B64C 11/14* (2013.01); *F02C 3/107* (2013.01); *F02C 7/04* (2013.01); *F02C 7/36* (2013.01); *F02K 3/06* (2013.01); *F05D 2220/36* (2013.01); *F05D 2250/232* (2013.01); *F05D 2250/24* (2013.01); *F05D 2260/40311* (2013.01)

(58) Field of Classification Search
CPC ................................... B64C 11/14; F02C 7/04
See application file for complete search history.

(56) References Cited

U.S. PATENT DOCUMENTS

| | | | | |
|---|---|---|---|---|
| 2,755,868 A | * | 7/1956 | Smith | B64C 11/14 416/234 |
| 4,047,379 A | | 9/1977 | Brookes et al. | |
| 4,129,984 A | * | 12/1978 | Nelson | F02C 7/047 137/15.1 |

(Continued)

FOREIGN PATENT DOCUMENTS

WO 2014058466 A1 4/2014

OTHER PUBLICATIONS

European Search Report for European Application No. 15171131.4 completed Nov. 5, 2015.

*Primary Examiner* — Igor Kershteyn
*Assistant Examiner* — Jason Fountain
(74) *Attorney, Agent, or Firm* — Carlson, Gaskey & Olds, P.C.

(57) ABSTRACT

A fan section comprises a fan rotor having a plurality of blades and a spinner positioned forwardly of the fan rotor. The fan rotor is driven through a gear reduction. The spinner includes a spinner body having an outer surface with a forward end and a rearward end. A conical line extends between the forward end to the rear end. A first radius is measured from a centerline of the spinner at substantially 0.25 of a length of the spinner to the conical line. A second radius is also measured at substantially 0.25 of the length and extends outwardly to the outer surface of the spinner. A ratio of the second radius to the first radius is less than or equal to about 2.0. A gas turbine engine is also disclosed.

3 Claims, 2 Drawing Sheets

(56) References Cited

U.S. PATENT DOCUMENTS

| | | | |
|---|---|---|---|
| 4,327,548 A | 5/1982 | Woodward | |
| 4,393,650 A * | 7/1983 | Pool | F02C 7/047 416/132 R |
| 5,038,560 A | 8/1991 | Seed | |
| 5,182,906 A * | 2/1993 | Gilchrist | F02C 7/05 416/245 R |
| 8,181,441 B2 * | 5/2012 | Smith | F01D 17/10 60/204 |
| 10,054,059 B2 * | 8/2018 | Schwarz | F02K 3/06 |
| 2007/0084186 A1 | 4/2007 | Orlando et al. | |
| 2008/0120839 A1 | 5/2008 | Schilling | |
| 2013/0004297 A1 | 1/2013 | Sheridan | |
| 2017/0106991 A1 * | 4/2017 | Clark | B64D 33/02 |

* cited by examiner

GEARED TURBOFAN WITH IMPROVED SPINNER

CROSS-REFERENCE TO RELATED APPLICATION

This application claims priority to U.S. Provisional Patent Application No. 62/010,105, filed Jun. 10, 2014.

BACKGROUND OF THE INVENTION

This application relates to a gas turbine engine wherein the spinner, located forwardly of the fan rotor, has an improved shape.

Gas turbine engines are known and, typically include a fan delivering air into a bypass duct as propulsion air. Air is also delivered into a compressor where it is compressed and delivered into a combustion section. The air is mixed with fuel and ignited in the combustion section, and products of this combustion pass downstream over turbine rotors driving them to rotate.

A spinner has typically been placed forwardly of the fan rotor and is a generally solid part, which may also be known as a nosecone. The spinner presents a forward most portion of the gas turbine engine and directs air toward the fan rotor.

However, the spinner may also deflect debris. It has been known to utilize conical shaped spinners, however, these channel debris, such as stones, directly into the fan rotor and, thus, into the compressor. This is, of course, undesirable.

It has also been known to utilize a spinner which has an effective elliptical or parabolic shape in cross-section. This does a better job of "bouncing" foreign objects away from the fan rotor and the core of the engine. However, this comes at the expense of higher drag and resulting lower total pressure recovery going into the fan root.

Historically, the fan rotor has been driven at the same speed as a fan drive turbine rotor. This has limited the speed of the fan drive turbine rotor due to limitations on the speed of the fan rotor.

However, recently it has been proposed to employ a gear reduction between the fan rotor and the fan drive turbine. This has allowed the fan drive turbine to rotate at higher speeds, and has also allowed the fan rotor to increase in diameter. With this increase in diameter, there has also been an increase in bypass ratio. The bypass ratio is a ratio of the volume of air delivered into the bypass duct compared to the volume of air delivered into the compressor.

As the bypass ratio becomes higher, it becomes more important to efficiently utilize the air delivered into the compressor.

SUMMARY OF THE INVENTION

In a featured embodiment, a fan section comprises a fan rotor having a plurality of blades and a spinner positioned forwardly of the fan rotor. The fan rotor is driven through a gear reduction. The spinner includes a spinner body having an outer surface with a forward end and a rearward end. A conical line extends between the forward end to the rear end. A first radius is measured from a centerline of the spinner at substantially 0.25 of a length of the spinner to the conical line. A second radius is also measured at substantially 0.25 of the length and extends outwardly to the outer surface of the spinner. A radius ratio of the second radius to the first radius is less than or equal to about 2.0.

In another embodiment according to the previous embodiment, the first and second radii are measured at 0.25 of the length.

In another embodiment according to any of the previous embodiments, a bypass ratio for the fan section is greater than or equal to about 10.0.

In another embodiment according to any of the previous embodiments, the bypass ratio is greater than or equal to about 12.0.

In another embodiment according to any of the previous embodiments, the radius ratio is less than or equal to about 1.8.

In another embodiment according to any of the previous embodiments, the radius ratio is less than or equal to about 1.5.

In another embodiment according to any of the previous embodiments, the radius ratio is equal to about 1.0.

In another embodiment according to any of the previous embodiments, a gear ratio of the gear reduction is greater than or equal to about 3.0.

In another featured embodiment, a gas turbine engine comprises a compressor, and a fan section including a fan drive turbine rotor driving a fan rotor through a gear reduction. The rotor has a plurality of blades and a spinner positioned forwardly of the fan rotor. The spinner includes a spinner body having an outer surface with a forward end and a rearward end. A conical line extends between the forward end to the rear end. A first radius is measured from a centerline of the spinner at substantially 0.25 of a length of the spinner to the conical line. A second radius is also measured at substantially 0.25 of the length and extends outwardly to the outer surface of the spinner. A radius ratio of the second radius to the first radius is less than or equal to about 2.0.

In another embodiment according to the previous embodiment, the first and second radii are measured at 0.25 of the length.

In another embodiment according to any of the previous embodiments, a bypass ratio for the fan section is greater than or equal to about 10.0.

In another embodiment according to any of the previous embodiments, the bypass ratio is greater than or equal to about 12.0.

In another embodiment according to any of the previous embodiments, a gear ratio of the gear reduction is greater than or equal to about 2.6.

In another embodiment according to any of the previous embodiments, a gear ratio of the gear reduction is greater than or equal to about 3.0.

In another embodiment according to any of the previous embodiments, a fan pressure ratio is less than or equal to about 1.45.

In another embodiment according to any of the previous embodiments, a gear ratio of the gear reduction is greater than or equal to about 3.0.

In another embodiment according to any of the previous embodiments, a fan pressure ratio is less than or equal to about 1.45.

In another embodiment according to any of the previous embodiments, the radius ratio is less than or equal to about 1.8.

In another embodiment according to any of the previous embodiments, the radius ratio is less than or equal to about 1.5.

In another embodiment according to any of the previous embodiments, the radius ratio is equal to about 1.0.

These and other features may be best understood from the following drawings and specification.

DETAILED DESCRIPTION

Figure 1:
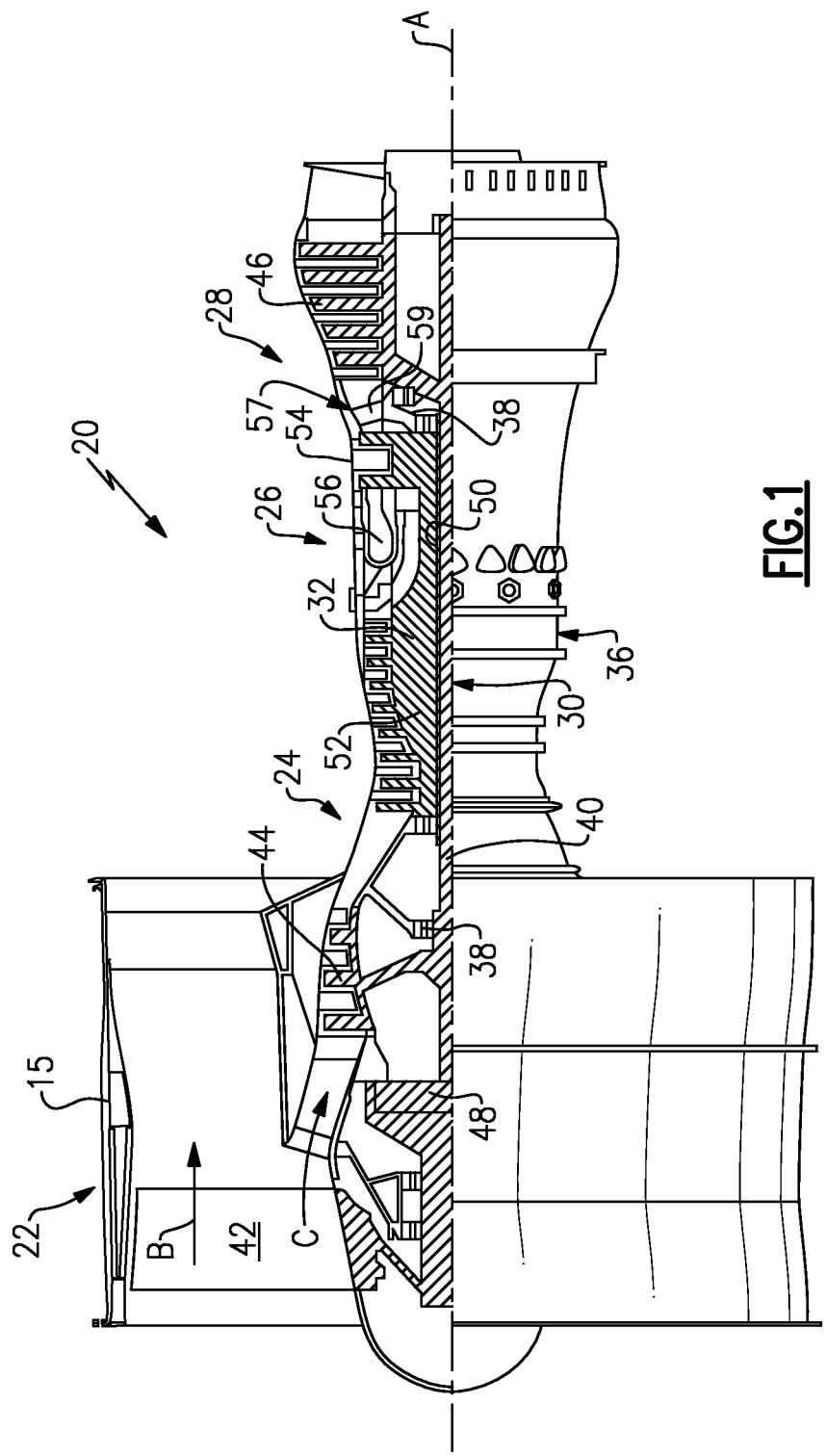
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2A:
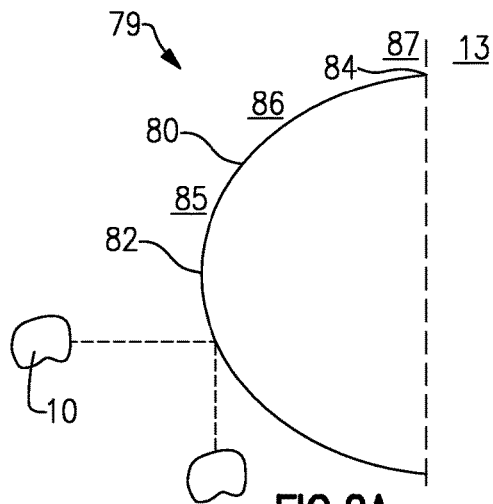
FIG. 2A shows a first prior art spinner.

As shown in FIG. 2A, a generally elliptical spinner 79 has an outer surface 80 extending from a forward most point 82 to a rear point 84 leading into fan blades. As the air approaches the parabolic spinner 79, there is a rather substantial region that must be driven through the air at high speed. The front of spinner 79 presents a somewhat plate-like obstruction at area 85. The forces and energy lost in driving this plate-like portion through the air at this speed is very high. Thus, this plate effect is undesirable.

At region 86, the airflow streamlines and over-accelerates to a pressure and direction vector that is not consistent with the desired fan root path at areas 87. Thus, more energy is lost along here since the streamline of air is not well-aligned to the air direction. Thus, between areas 86 and 87, the air is expanding and turning. The pressure loss at areas A, B and C are of particular interest to a slow turning, large diameter fan rotor, such as utilized in those including a gear reduction as mentioned above.

In such an engine, the fan pressurized at the root of the blade is very low due to the low tangential speed that occurs at such a location.

Figure 2B:
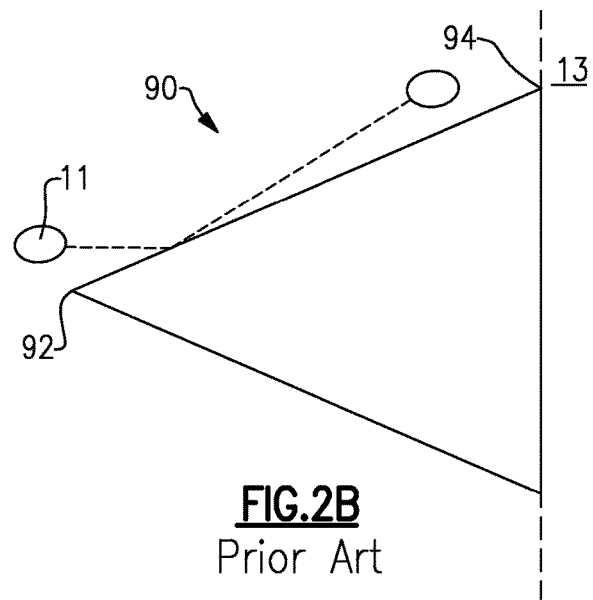
FIG. 2B shows a second prior art spinner.

FIG. 2B shows the conical spinner 90 extending from forward point 92 to rear point 94. Spinner 90 does not present the losses as found with spinner 79. Again, a major downside of such a spinner is that it does not "bounce" foreign objects outwardly.

It should be understood that the FIG. 2B is only "prior art" with gas turbine engines that did not include a gear reduction driving a fan, nor the high bypass ratios as mentioned above.

As shown in FIG. 2A, should debris, such as rock 10, strike the spinner 79, it would be deflected generally radially outwardly. Contrast this to rock 11 striking the conical spinner 90, which would be directed toward the area 13, which includes the fan rotor.

Figure 3:
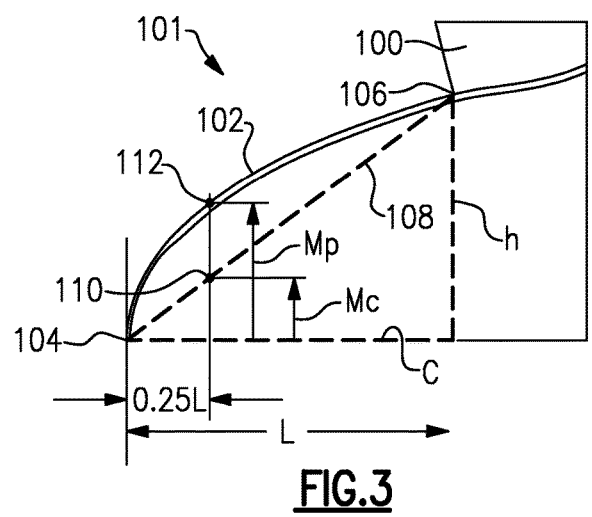
FIG. 3 shows a spinner consistent with the present invention.

FIG. 3 shows a spinner 101 to be positioned at the forward end of an engine, such as engine 20 of FIG. 1. An outer surface shape of the spinner extends from a forward end 104 to a rear end 106, directly upstream of the root of the fan blade 100.

A line 108 could be defined between points 104 and 106, with the line defining a pure conical shape, such as disclosed in FIG. 2B. A first radial distance $M_C$ is defined from a centerline C to a point 110 on the line 108 at one-quarter of the axial length L (0.25 L) of the spinner 101. As shown, spinner 101 has an overall axial length L measured along the centerline C from point 104 to a point perpendicular to point 106. Further, a second radial distance $M_P$ is defined from the line C to a point 112 on the outer surface 102 of the spinner 101.

In the prior art conical spinner 90 of FIG. 2B, the distance $M_P$ would equal the distance $M_C$. In the prior art spinner 79 of FIG. 2A, the distance $M_P$ would be much greater than the distance $M_C$.

In the disclosed shape, the radius to point $M_P$ is less than two (2) times the radius $M_C$. With such a shape, the "plate" effect, as described above, is reduced, but the spinner 101 still bounces foreign objects away from the fan blades 100. This spinner 101 additionally avoids the efficiency losses as mentioned above.

Stated another way, within spinner 101 a right triangle is defined having a base extending along an axial length L of the spinner, a height h from the aft edge 106 of the spinner to the triangle base, and a hypotenuse 108 therebetween. Mc is a first radial distance, measured at a quarter length from the forward edge 104 of the triangle base to the hypotenuse. Mp is a second radial distance measured from the same location on the base to the surface 112 of the arcuate spinner. Mp is less than twice Mc.

It should be understood that the quarter length could be measured at any location substantially at 0.25 of the length. Moreover, in further embodiments, Mp at the substantial quarter length may be least 1.8 Mc. In further embodiments, a ratio of Mp to Mc may be less than 1.5. In some applications, $M_P$ may be equal to $M_C$, when the spinner actually has a conical shape, at least at substantially a quarter length. In this embodiment, the outer surface is the line 108. Taken across the above embodiments, it could be said that the ration is greater than 1.0 and less than 2.0, and in some embodiments between 1.8 and 2.0. Again, the conical spinner or the close to conical spinners, as disclosed in this application, have never been utilized in conjunction with a geared turbofan, nor a turbofan having the high bypass ratio as mentioned above.

A bypass ratio in embodiments may be greater than or equal to about 12.0. Further, a gear ratio for the gear reduction 48 may be greater than or equal to about 3.0. At these extremely high bypass ratios and at this high gear ratio and higher, the root of each fan blade is turning at a very low speed and the local pressure rise of the root section is enhanced by the conical, or close to conical, shape to a high degree owing to its low starting point compared to an elliptical spinner.

Also, at these high bypass ratios the fan is extremely long and the chord of the airfoil at the root can necessarily be made extremely long to control this long blade from experiencing aeroelastic instability. This long chord inherently improves the chance that the fan can pump stones out of the way before the stone can reach a compressor inlet. Thus, the spinner in this disclosure does not have the concern from stones that the FIG. 2B prior art spinner does.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan section comprising:
    a fan rotor having a plurality of blades and a spinner positioned forwardly of said fan rotor, said fan rotor is driven through a gear reduction;
    the spinner including a spinner body having an outer surface with a forward end and a rearward end; and
    a conical line defined extending between said forward end to said rear end, and a first radius measured from a centerline of the spinner at 0.25 of a length of the spinner to the conical line, and a second radius also measured at 0.25 of the length and extending outwardly to the outer surface of the spinner, with a radius ratio of said second radius to said first radius being greater than or equal to about 1.8 and less than or equal to about 2.0.

2. A gas turbine engine comprising:
    a compressor, and a fan section including a fan drive turbine rotor driving a fan rotor through a gear reduction, said fan rotor having a plurality of blades and a spinner positioned forwardly of said fan rotor;
    the spinner including a spinner body having an outer surface with a forward end and a rearward end; and
    a conical line defined extending between said forward end to said rear end, and a first radius measured from a centerline of the spinner at 0.25 of a length of the spinner to the conical line, and a second radius also measured at 0.25 of the length and extending outwardly to the outer surface of the spinner, with a radius ratio of said second radius to said first radius being greater than or equal to 1.8 and less than or equal to about 2.0.

3. The gas turbine engine as set forth in claim 2, wherein a fan pressure ratio is less than or equal to about 1.45.

* * * * *